(12) United States Patent
Wu

(10) Patent No.: US 10,512,115 B2
(45) Date of Patent: Dec. 17, 2019

(54) DEVICE AND METHOD OF HANDLING DATA TRANSMISSION

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 239 days.

(21) Appl. No.: 15/834,021

(22) Filed: Dec. 6, 2017

(65) Prior Publication Data

US 2018/0167810 A1 Jun. 14, 2018

Related U.S. Application Data

(60) Provisional application No. 62/431,439, filed on Dec. 8, 2016.

(51) Int. Cl.
*H04W 76/20* (2018.01)
*H04W 12/04* (2009.01)
*H04L 29/06* (2006.01)

(52) U.S. Cl.
CPC ......... *H04W 76/20* (2018.02); *H04L 63/0485* (2013.01); *H04W 12/04* (2013.01)

(58) Field of Classification Search
CPC ..... H04W 76/20; H04W 12/04; H04W 76/15; H04W 12/02; H04L 63/0485; H04L 63/0876; H04L 63/061
See application file for complete search history.

(56) References Cited

U.S. PATENT DOCUMENTS

| 2013/0155903 | A1* | 6/2013 | Bi | H04B 7/024 |
| | | | | 370/255 |
| 2015/0264562 | A1* | 9/2015 | Wu | H04W 12/04 |
| | | | | 380/270 |

(Continued)

FOREIGN PATENT DOCUMENTS

| EP | 2919519 A1 | 9/2015 |
| EP | 3177071 A1 | 6/2017 |

(Continued)

OTHER PUBLICATIONS

3GPP TS 25.331 2011-09, Technical Specification Group Radio Access Network; Radio Resource Control Release 9, Network, pp. 1-48.*

(Continued)

*Primary Examiner* — Jung W Kim
*Assistant Examiner* — Thomas Ho
(74) *Attorney, Agent, or Firm* — Winston Hsu

(57) ABSTRACT

A communication device of handling data transmission comprises configuring a first bearer and a second bearer according to at least one bearer configuration received from a network; encrypting a first packet of a first flow into a first encrypted packet according to an encryption key and a first bearer identity of the first bearer; receiving a first RRC message from the network before transmitting the first encrypted packet to the network successfully, wherein the first RRC message configures the communication device to transmit at least one packet of the first flow via the second bearer to the network; transmitting the first encrypted packet to the network via the first bearer; encrypting a second packet of the first flow into a second encrypted packet according to the encryption key and a second bearer identity of the second bearer; and transmitting the second encrypted packet to the network via the second bearer.

15 Claims, 7 Drawing Sheets

(56) References Cited

U.S. PATENT DOCUMENTS

2017/0085452 A1* 3/2017 Kato .................... H04W 76/18
2017/0353992 A1* 12/2017 Quan ................... H04W 76/20

FOREIGN PATENT DOCUMENTS

WO    WO-2014181178 A1 * 11/2014
WO       2015/184889 A1   12/2015

OTHER PUBLICATIONS

3GPP TS 36.331 2016-01, Evolved Universal Terrestial Radio Access; Radio Resource Control, Network, pp. 1-670.*
Search Report dated Apr. 20, 2018 for EP application No. 17206155.8, pp. 1-6.
Samsung, "Overall PDCP operation in Dual-Connectivity", 3GPP TSG-RAN WG2 Meeting #87, R2-143081, Aug. 8-22, 2014, Dresden, Germany, XP050794208, pp. 1-5.
Panasonic, "PDCP status report for split bearer to MCG reconfiguration case", 3GPP TSG RAN WG2 Meeting #87bis, R2-144379, Oct. 6-10, 2014, Shanghai, China, XP050876586, pp. 1-2.
3GPP TS 33.401 V13.3.0, Jun. 2016.
3GPP TR 23.799 V1.1.0, Oct. 2016.

* cited by examiner

DEVICE AND METHOD OF HANDLING DATA TRANSMISSION

CROSS REFERENCE TO RELATED APPLICATIONS

This application claims the benefit of U.S. Provisional Application No. 62/431,439 filed on Dec. 8, 2016, which is incorporated herein by reference.

BACKGROUND OF THE INVENTION

1. Field of the Invention

The present invention relates to a device and a method used in a wireless communication system, and more particularly, to a device and a method of handling data transmission.

2. Description of the Prior Art

A user equipment (UE) may process data and transmit the data to a network according to a first configuration received from the network. Then, the UE may receive a second configuration for processing the data and transmitting the data to the network from the network, before the UE transmits the data to the network according to the first configuration successfully. However, it is unknown how to handle the data according to both the first configuration and the second configuration. As a result, data transmission between the UE and the network may not be performed properly.

SUMMARY OF THE INVENTION

The present invention therefore provides a communication device and method for handling data transmission to solve the abovementioned problem.

A communication device of handling data transmission comprises a storage device for storing instructions and a processing circuit coupled to the storage device. The processing circuit is configured to execute the instructions stored in the storage device. The instructions comprise configuring a first bearer and a second bearer according to at least one bearer configuration received from a network; encrypting a first packet of a first flow into a first encrypted packet according to an encryption key and a first bearer identity of the first bearer; receiving a first radio resource control (RRC) message from the network before transmitting the first encrypted packet to the network successfully, wherein the first RRC message configures the communication device to transmit at least one packet of the first flow via the second bearer to the network; transmitting the first encrypted packet to the network via the first bearer, after receiving the first RRC message; encrypting a second packet of the first flow into a second encrypted packet according to the encryption key and a second bearer identity of the second bearer in response to the first RRC message; and transmitting the second encrypted packet to the network via the second bearer.

A communication device of handling data transmission comprises a storage device for storing instructions and a processing circuit coupled to the storage device. The processing circuit is configured to execute the instructions stored in the storage device. The instructions comprise configuring a first bearer and a second bearer according to at least one bearer configuration received from a network; encrypting a first packet of a first flow into a first encrypted packet according to an encryption key and a first bearer identity of the first bearer; receiving a second packet of the first flow from the network via the second bearer, before transmitting the first encrypted packet to the network successfully; transmitting the first encrypted packet to the network via the first bearer, after receiving the second packet; encrypting a third packet of the first flow into a second encrypted packet according to the encryption key and a second bearer identity of the second bearer in response to the second packet; and transmitting the second encrypted packet to the network via the second bearer.

A network of handling data transmission comprises a storage device for storing instructions and a processing circuit coupled to the storage device. The processing circuit is configured to execute the instructions stored in the storage device. The instructions comprise transmitting at least one bearer configuration configuring a first bearer and a second bearer to a communication device; encrypting a first packet of a first flow into a first encrypted packet according to an encryption key and a first bearer identity of the first bearer; transmitting a first radio resource control (RRC) message to the communication device before transmitting the first encrypted packet to the communication device successfully, wherein the first RRC message configures the communication device to transmit at least one packet of the first flow to the network via the second bearer; transmitting the first encrypted packet to the communication device via the first bearer, after transmitting the first RRC message; encrypting a second packet of the first flow into a second encrypted packet according to the encrypted key and a second bearer identity of the second bearer in response to the first RRC message; and transmitting the second encrypted packet to the communication device via the second bearer.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
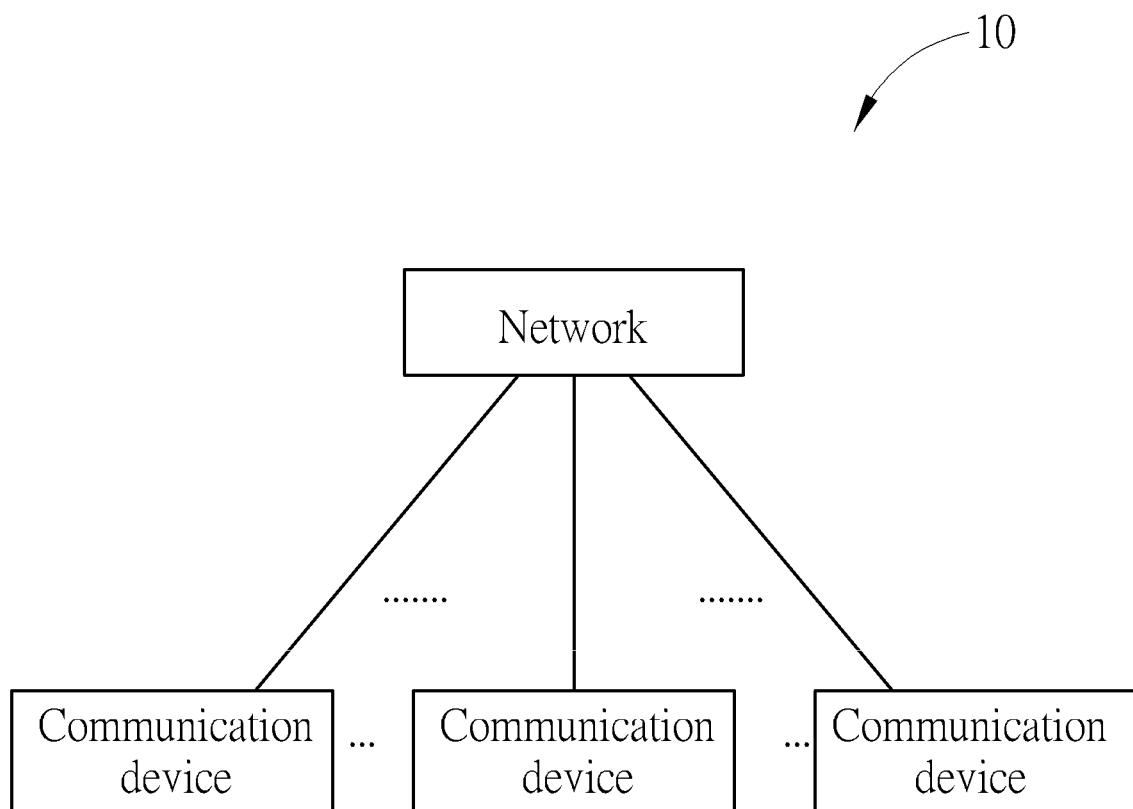
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers. The network and the communication device may simultaneously communicate with each other via one or multiple cells (e.g., one or multiple carriers) belonging to one or multiple base station (BS). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network may be an evolved universal terrestrial radio access network (E-UTRAN) including at least one evolved Node-B (eNB) in a long term evolution (LTE) system, a LTE-Advanced (LTE-A) system, an evolution of the LTE-A system. The network may be a fifth generation (5G, or called new radio (NR)) network including at least one 5G BS (e.g., gNB). The 5G network employs orthogonal frequency-division multiplexing (OFDM) and/or non-OFDM. The 5G network supports a transmission time interval (TTI) shorter than 1 ms (e.g., 1, 2, 3 or 4 OFDM symbols and 100 or 200 microseconds), and supports a system bandwidth wider than 20 MHz, to communicate with the communication devices. In general, a BS may also be used to refer any of the eNB and the 5G BS.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
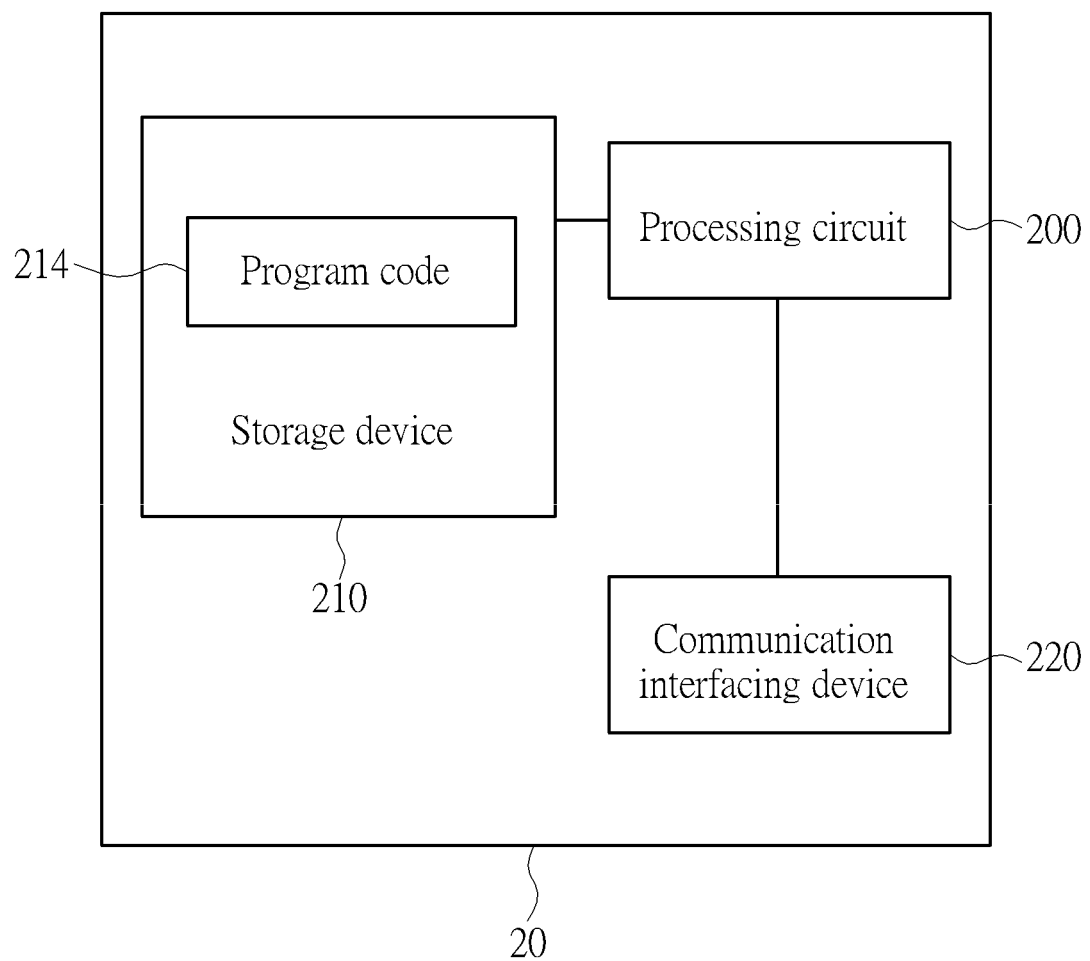
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage device 210 and a communication interfacing device 220. The storage device 210 may be any data storage device that may store a program code 214, accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The communication interfacing device 220 includes at least one transceiver used to transmit and receive signals (e.g., data, messages and/or packets) according to processing results of the processing circuit 200. The BS may belong to (e.g., is managed/controlled by) the network to perform steps or instructions for realizing the following examples.

In the following examples, a UE is used for representing the communication device in FIG. 1, to simplify the illustration of the examples.

Figure 3:
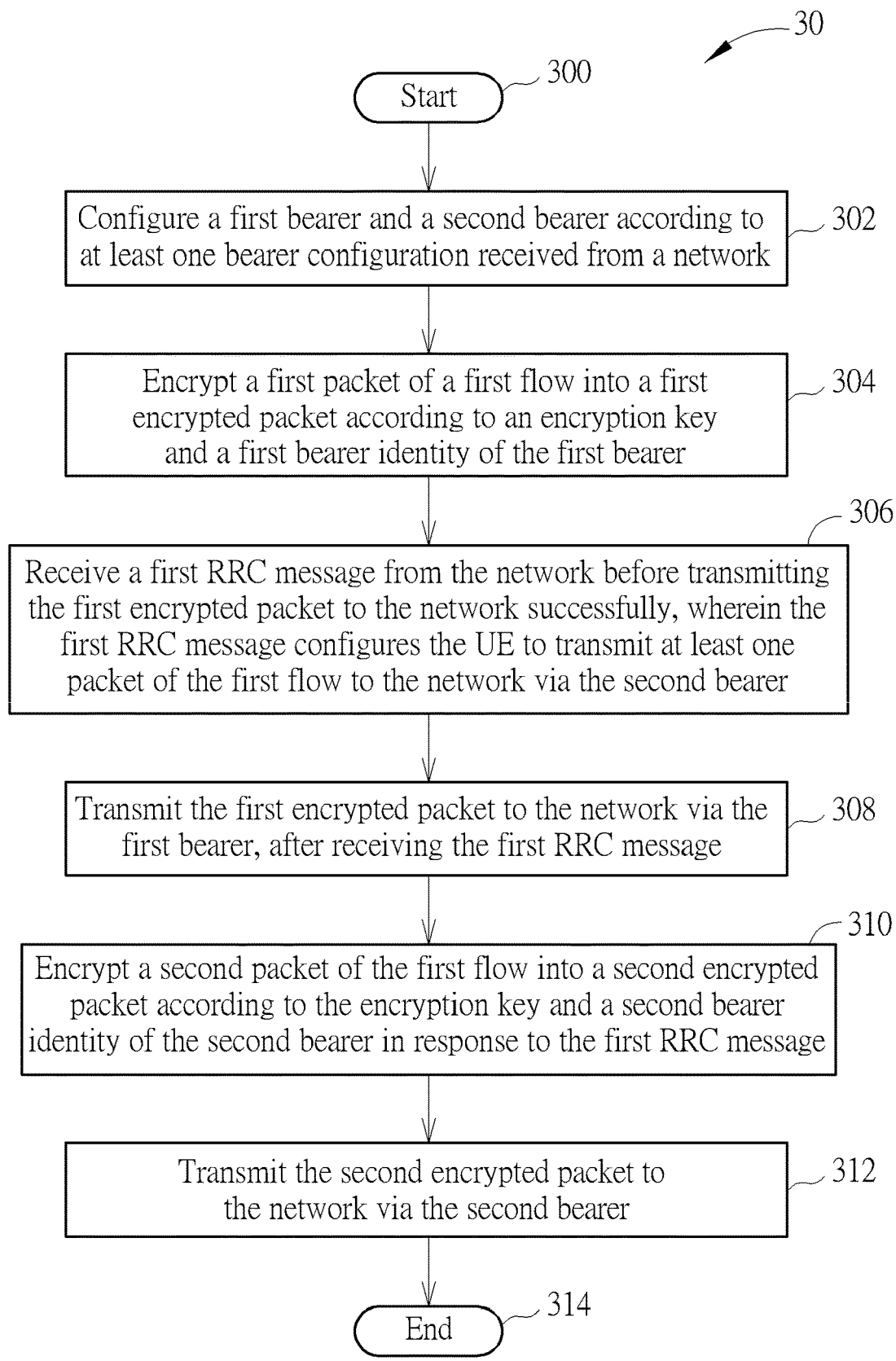
FIG. 3 is a flowchart of a process according to an example of the present invention.

FIG. 3 is a flowchart of a process 30 according to an example of the present invention. The process 30 may be utilized in a UE, to handle data transmission. The process 30 includes the following steps:

Step 300: Start.

Step 302: Configure a first bearer and a second bearer according to at least one bearer configuration received from a network.

Step 304: Encrypt a first packet of a first flow into a first encrypted packet according to an encryption key and a first bearer identity of the first bearer.

Step 306: Receive a first radio resource control (RRC) message from the network before transmitting the first encrypted packet to the network successfully, wherein the first RRC message configures the UE to transmit at least one packet of the first flow to the network via the second bearer.

Step 308: Transmit the first encrypted packet to the network via the first bearer, after receiving the first RRC message.

Step 310: Encrypt a second packet of the first flow into a second encrypted packet according to the encryption key and a second bearer identity of the second bearer in response to the first RRC message.

Step 312: Transmit the second encrypted packet to the network via the second bearer.

Step 314: End.

It should be noted that, the first RRC message may not release the first bearer.

Figure 4:
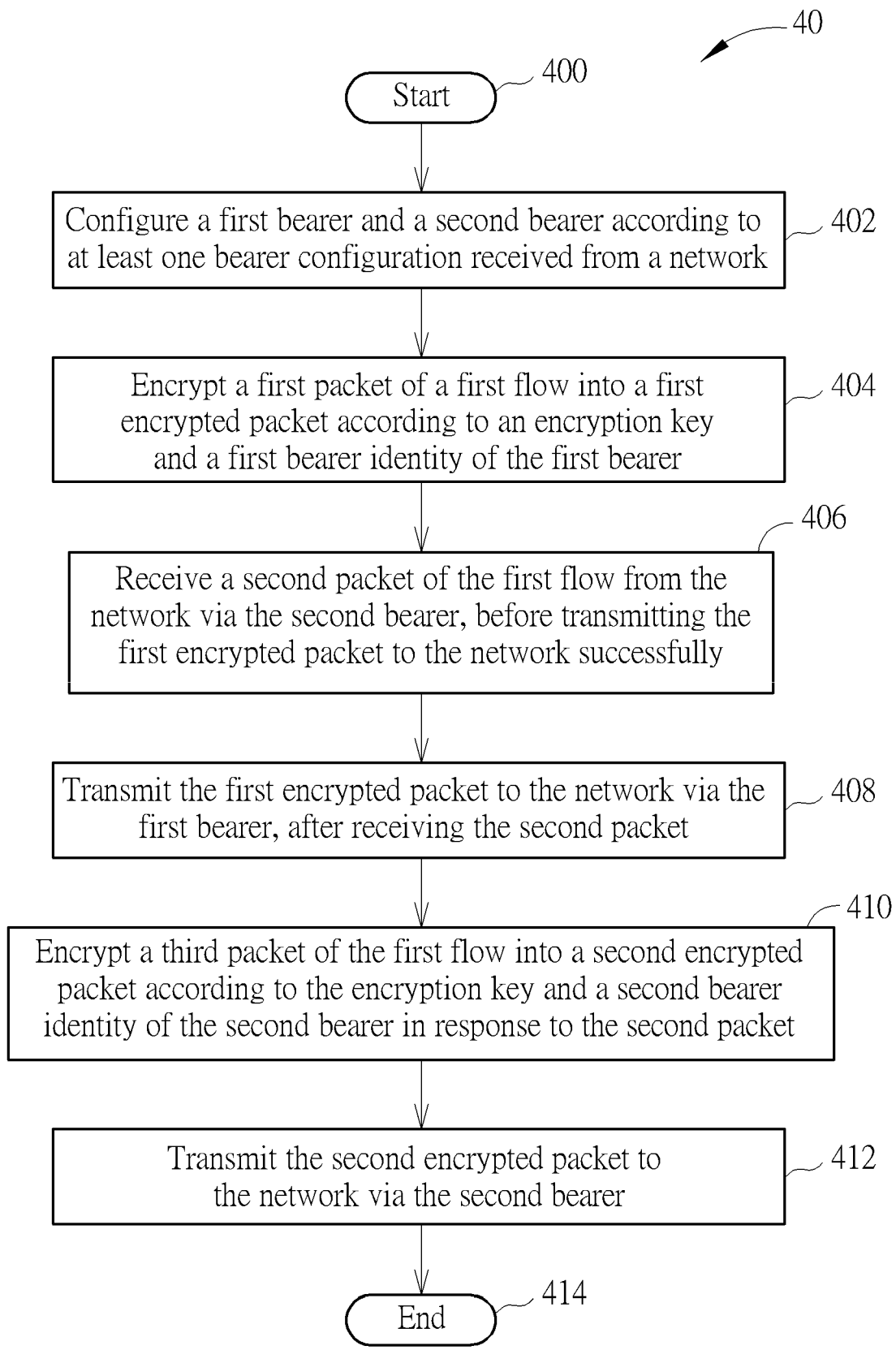
FIG. 4 is a flowchart of a process according to an example of the present invention.

FIG. 4 is a flowchart of a process 40 according to an example of the present invention. The process 40 may be utilized in a UE, to handle data transmission. The process 40 includes the following steps:

Step 400: Start.

Step 402: Configure a first bearer and a second bearer according to at least one bearer configuration received from a network.

Step 404: Encrypt a first packet of a first flow into a first encrypted packet according to an encryption key and a first bearer identity of the first bearer.

Step 406: Receive a second packet of the first flow from the network via the second bearer, before transmitting the first encrypted packet to the network successfully.

Step 408: Transmit the first encrypted packet to the network via the first bearer, after receiving the second packet.

Step 410: Encrypt a third packet of the first flow into a second encrypted packet according to the encryption key and a second bearer identity of the second bearer in response to the second packet.

Step 412: Transmit the second encrypted packet to the network via the second bearer.

Step 414: End.

In one example, the second packet received via the second bearer includes a reflective Quality of Service (QoS) indication. In one example, the UE applies the reflective QoS indication by encrypting the third packet into the second encrypted packet according to (e.g., by using) the encryption key and the second bearer identity, and transmits the second encrypted packet to the network via the second bearer.

To support a high data rate, the UE may pre-process the first packet by encrypting the first packet according to (e.g., by using) the encryption key and the first bearer identity of the first bearer, before a transmission time of the first packet occurs. The processes 30 and 40 provide a benefit that the UE does not need to discard the first encrypted packet and to encrypt the first packet again according to (e.g., by using) the encryption key and the second bearer identity.

Figure 5:
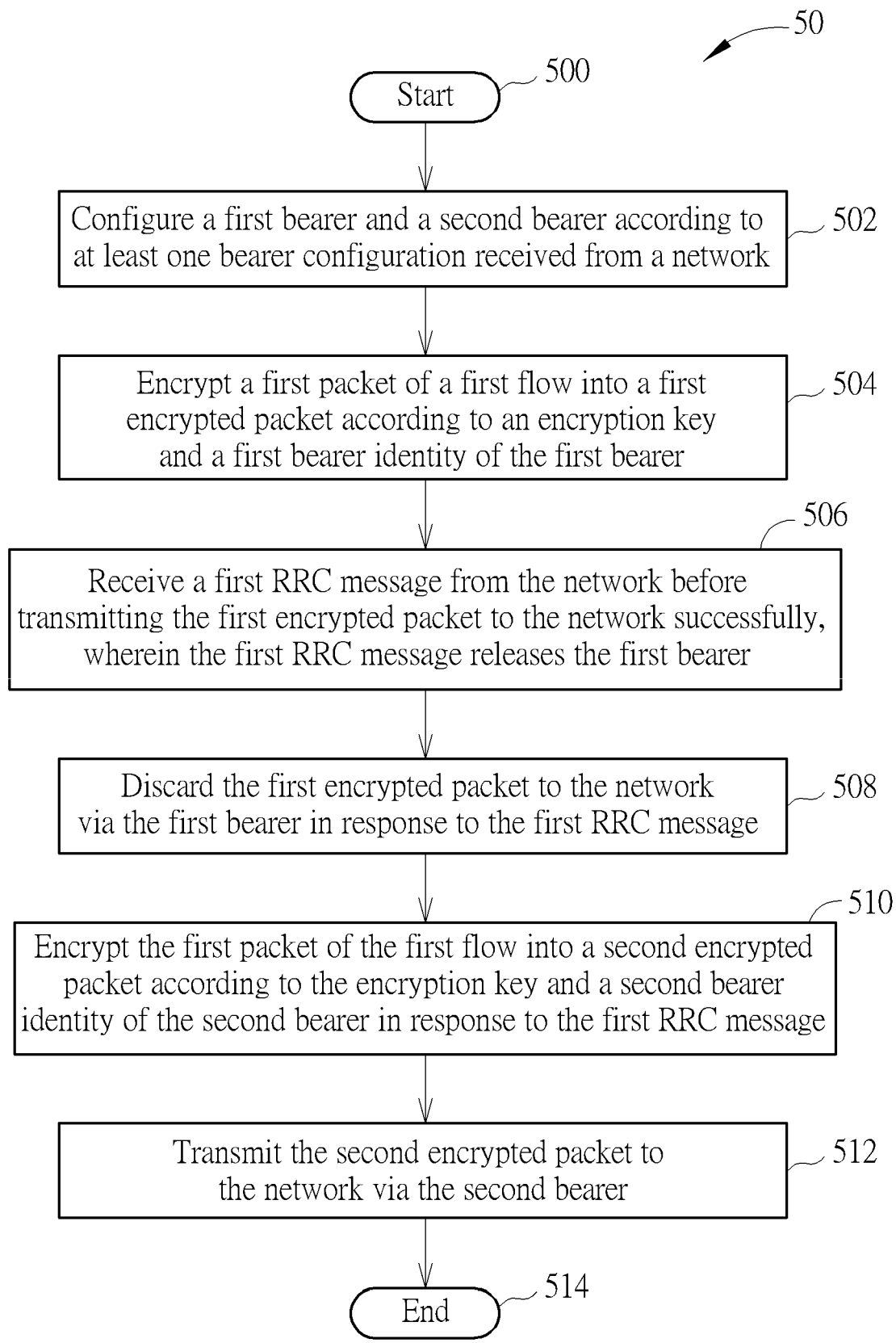
FIG. 5 is a flowchart of a process according to an example of the present invention.

FIG. 5 is a flowchart of a process 50 according to an example of the present invention. The process 50 may be utilized in a UE, to handle data transmission. The process 50 includes the following steps:

Step 500: Start.

Step 502: Configure a first bearer and a second bearer according to at least one bearer configuration received from a network.

Step 504: Encrypt a first packet of a first flow into a first encrypted packet according to an encryption key and a first bearer identity of the first bearer.

Step 506: Receive a first RRC message from the network before transmitting the first encrypted packet to the network successfully, wherein the first RRC message releases the first bearer.

Step 508: Discard the first encrypted packet to the network via the first bearer in response to the first RRC message.

Step 510: Encrypt the first packet of the first flow into a second encrypted packet according to the encryption key and a second bearer identity of the second bearer in response to the first RRC message.

Step 512: Transmit the second encrypted packet to the network via the second bearer.

Step 514: End.

It should be noted that, the first RRC message may or may not configure the UE to transmit at least one packet of the first flow to the network via the second bearer. The step 508 refers to discard the first encrypted packet in response to the first RRC message.

A benefit of the process 50 is to avoid that the network considers an error occurred when the network receives the first encrypted packet via an unknown bearer (e.g., the first bearer which has been released).

Realization of the processes 30-50 is not limited to the above description. The following examples may be applied to the processes 30-50, and examples of the processes 30-50 may be combined.

The step of receiving the first RRC message/the second packet from the network before transmitting the first encrypted packet to the network successfully includes at least one of the following examples. In one example, the UE receives the first RRC message/the second packet from the network, before transmitting the first encrypted packet to the network (i.e., the UE has not transmitted the first encrypted packet to the network). In one example, the UE receives the first RRC message/the second packet from the network, after transmitting the first encrypted packet to the network but has not received an acknowledgment of the first encrypted packet from the network (i.e., the UE has transmitted the first encrypted packet to the network, but has not received the acknowledgment acknowledging the first encrypted packet from the network).

The at least one bearer configuration may be at least one DRB configuration. The UE receives at least one second RRC message from the network, wherein the at least one second RRC message includes the at least one bearer configuration. The at least one bearer configuration may include the first bearer identity and the second bearer identity. The UE may encrypt a plurality of packets of the first flow into a plurality of encrypted packets and may transmit the plurality of encrypted packets to the network via the first bearer, when the UE configures the first bearer according to one of the at least one bearer configuration. The UE may receive a plurality of encrypted packets of the first flow from the network via the first bearer and may decrypt the plurality of encrypted packets of the first flow to a plurality of packets, when the UE configures the first bearer according to one of the at least one bearer configuration.

In one example, one of the at least one second RRC message indicates (e.g., explicitly) that the first flow is mapped to the first bearer (i.e., configures the UE to transmit at least one packet of the first flow to the network via the first bearer) by including a mapping configuration. In one example, the one of the at least one second RRC message indicates (e.g., implicitly) that the first flow is mapped to the first bearer, if all of the at least one second RRC message does not include the mapping configuration.

In one example, one of the at least one second RRC message or the first RRC message indicates (e.g., explicitly or implicitly) that a second flow is mapped to the first bearer. The UE/network transmits at least one packet of the second flow to the network/UE via the first bearer, when the second flow is mapped to the first bearer. In one example, one of the at least one second RRC message or the first RRC message indicates (e.g., explicitly) that the second flow is mapped to the first bearer by including a mapping configuration. In one example, the one of the at least one second RRC message or the first RRC message indicates (e.g., implicitly) that the second flow is mapped to the first bearer, if all of the at least one second RRC message or the first RRC message does not include the mapping configuration.

In one example, one of the at least one second RRC message or the first RRC message indicates (e.g., explicitly or implicitly) that a second flow is mapped to the second bearer. The UE/network transmits at least one packet of the second flow to the network/UE via the second bearer, when the second flow is mapped to the second bearer. In one example, one of the at least one second RRC message or the first RRC message indicates (e.g., explicitly) that the second flow is mapped to the second bearer by including a mapping configuration. In one example, the one of the at least one second RRC message or the first RRC message indicates (e.g., implicitly) that the second flow is mapped to the second bearer, if all of the at least one second RRC message or the first RRC message does not include the mapping configuration.

Figure 6:
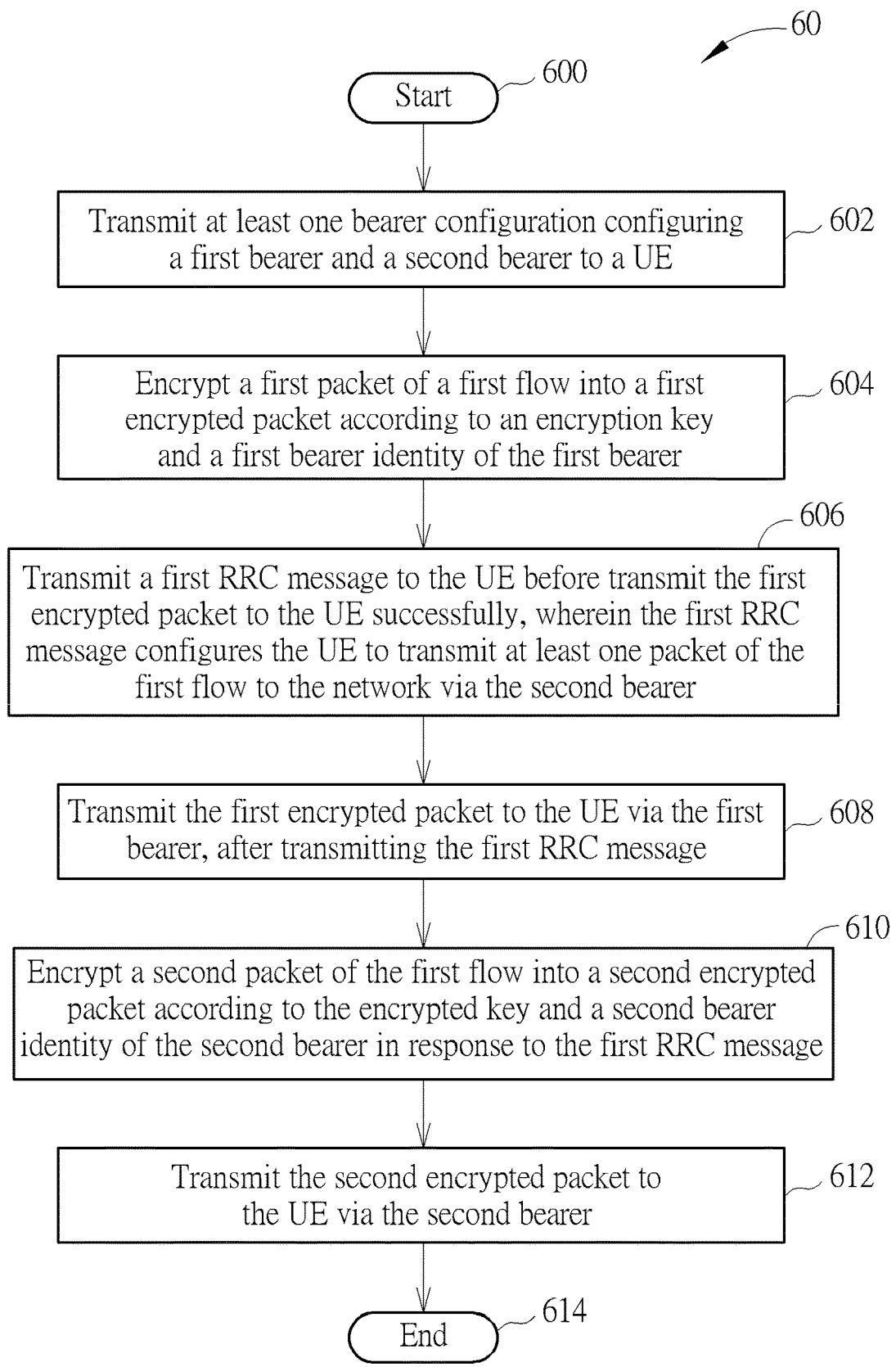
FIG. 6 is a flowchart of a process according to an example of the present invention.

FIG. 6 is a flowchart of a process 60 according to an example of the present invention. The process 60 may be utilized in a network (e.g., the network in FIG. 1), to handle data transmission. The process 60 includes the following steps:

Step 600: Start.

Step 602: Transmit at least one bearer configuration configuring a first bearer and a second bearer to a UE.

Step 604: Encrypt a first packet of a first flow into a first encrypted packet according to an encryption key and a first bearer identity of the first bearer.

Step 606: Transmit a first RRC message to the UE before transmit the first encrypted packet to the UE successfully, wherein the first RRC message configures the UE to transmit at least one packet of the first flow to the network via the second bearer.

Step 608: Transmit the first encrypted packet to the UE via the first bearer, after transmitting the first RRC message.

Step 610: Encrypt a second packet of the first flow into a second encrypted packet according to the encrypted key and a second bearer identity of the second bearer in response to the first RRC message.

Step 612: Transmit the second encrypted packet to the UE via the second bearer.

Step 614: End.

It should be noted that, the first RRC message may not release the first bearer.

To support a high data rate, the network may pre-process the first packet by encrypting the first packet according to (e.g., by using) the encryption key and the first bearer identity of the first bearer, before a transmission time of the first packet occurs. The process 60 provides a benefit that the network does not need to discard the first encrypted packet and to encrypt the first packet again according to (e.g., by using) the encryption key and the second bearer identity.

Figure 7:
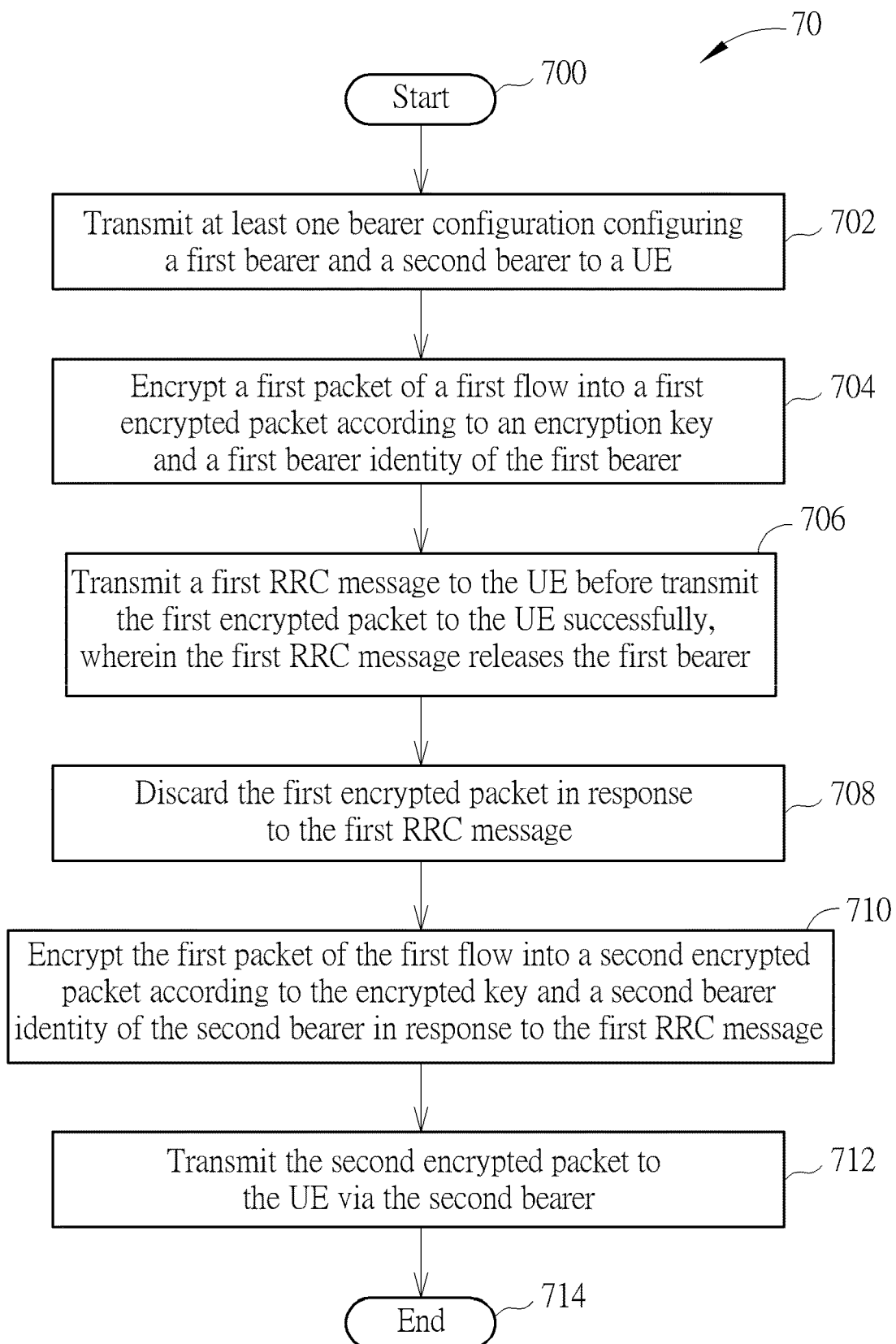
FIG. 7 is a flowchart of a process according to an example of the present invention.

FIG. 7 is a flowchart of a process 70 according to an example of the present invention. The process 70 may be utilized in a network (e.g., the network in FIG. 1), to handle data transmission. The process 70 includes the following steps:

Step 700: Start.

Step 702: Transmit at least one bearer configuration configuring a first bearer and a second bearer to a UE.

Step 704: Encrypt a first packet of a first flow into a first encrypted packet according to an encryption key and a first bearer identity of the first bearer.

Step 706: Transmit a first RRC message to the UE before transmit the first encrypted packet to the UE successfully, wherein the first RRC message releases the first bearer.

Step 708: Discard the first encrypted packet in response to the first RRC message.

Step 710: Encrypt the first packet of the first flow into a second encrypted packet according to the encrypted key and a second bearer identity of the second bearer in response to the first RRC message.

Step 712: Transmit the second encrypted packet to the UE via the second bearer.

Step 714: End.

A benefit of the process 70 is to avoid the UE considers that an error occurred when the UE receives the first encrypted packet via an unknown bearer (e.g., the first bearer which has been released).

It should be noted that, the first RRC message may or may not configure the UE to transmit at least one packet of the first flow to the network via the second bearer.

Realization of the processes 60-70 is not limited to the above description. The following examples may be applied to the processes 60-70, and examples of the processes 60-70 may be combined.

The step of transmitting the first RRC message to the UE before transmit the first encrypted packet to the UE successfully includes at least one of the following examples. In one example, the network transmits the first RRC message to the UE, before transmitting the first encrypted packet to the network to the UE (i.e., the network has not transmitted the first encrypted packet to the UE). In one example, the network transmits the first RRC message to the UE, after transmitting the first encrypted packet to the UE but not receiving an acknowledgment of the first encrypted packet from the UE (i.e., the network has transmitted the first encrypted packet to the UE, but has not received the acknowledgment acknowledging the first encrypted packet from the UE).

The network may transmit at least one second RRC message to the UE, wherein the at least one second RRC message includes the at least one bearer configuration. The network may encrypt a plurality of packets of the first flow into a plurality of encrypted packets and may transmit the plurality of encrypted packets to the UE via the first bearer, when the network configures the first bearer to the UE. The network may receive a plurality of encrypted packets of the first flow from the UE via the first bearer and may decrypt the plurality of encrypted packets of the first flow to a plurality of packets, when the network configures the first bearer to the UE.

In one example, one of the at least one second RRC message indicates (e.g., explicitly) that the first flow is mapped to the first bearer (i.e., configures the UE to transmit at least one packets of the first flow to the network via the first bearer) by including a mapping configuration. In one example, the one of the at least one second RRC message indicates (e.g., implicitly) that the first flow is mapped to the first bearer, if all of the at least one second RRC message does not include the mapping configuration.

In one example, one of the at least one second RRC message or the first RRC message indicates (e.g., explicitly or implicitly) that the second flow is mapped to the first bearer. The UE/network transmits at least one packet of the second flow to the network/UE via the first bearer, when the second flow is mapped to the first bearer. In one example, one of the at least one second RRC message or the first RRC message indicates (e.g., explicitly) that the second flow is mapped to the first bearer by including a mapping configuration. In one example, the one of the at least one second RRC message or the first RRC message indicates (e.g., implicitly) that the second flow is mapped to the first bearer, if all of the at least one second RRC message or the first RRC message does not include the mapping configuration.

In one example, one of the at least one second RRC message or the first RRC message indicates (e.g., explicitly or implicitly) that the second flow is mapped to the second bearer. The UE/network transmits at least one packet of the second flow to the network/UE via the second bearer, when the second flow is mapped to the second bearer. In one example, one of the at least one second RRC message or the first RRC message indicates (e.g., explicitly) that the second flow is mapped to the second bearer by including a mapping configuration. In one example, the one of the at least one second RRC message or the first RRC message indicates (e.g., implicitly) that the second flow is mapped to the second bearer, if all of the at least one second RRC message or the first RRC message does not include the mapping configuration.

Realization of the processes 30-70 above is not limited to the above description.

The first bearer and the second bearer may be DRBs. The first bearer identity and the second bearer identity may be DRB identities. The at least one bearer configuration may be at least one DRB configuration.

In one example, the first bearer is a default DRB with a first QoS configuration/profile, and the second bearer is a dedicated DRB with a second QoS configuration/profile different from the first QoS configuration/profile.

In one example, the first RRC message may be an "RRCConnectionReconfiguration" message defined for the LTE or NR.

Besides the encryption key and the bearer identity, other parameter(s) (e.g., "COUNT", "DIRECTION") may be used for encrypting a packet and for decrypting an encrypted packet. The acknowledgement may be a Radio Link Control (RLC) acknowledgement or a Packet Data Convergence Protocol (PDCP) status report.

Each of the first, second and third packets may include an Internet Protocol (IP) packet. Each of the first, second and third packets may be included in a Protocol Data Unit (PDU). The PDU may include a flow identity (e.g., QoS or IP flow identity), e.g., in a header of the PDU. The flow identity identifies the first flow (e.g., QoS flow or IP flow), and is configured by the network. The flow identity may be configured in the mapping configuration or has a default value. The UE knows (e.g., determines) that the packet included in the PDU belongs to a flow according to the flow identity, when the UE receives the PDU. In one example, the first, second and third packets may be Service Data Units (SDUs) of PDCP (i.e., PDCP SDUs) or PDUs of a protocol layer above PDCP defined for the 3GPP. Each of the first, second and third packets may be included in a PDCP PDU. A header of the PDCP PDU may include the flow identity.

The at least one bearer configuration may include at least one of DRB identity, IP or QoS flow identity, PDCP configuration and RLC configuration.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and related communication device for handling data transmission. Thus, the UE and the network know how to handle the data according to both the first configuration and the second configuration. As a result, the problem of the data transmission between the UE and the network is solved.

What is claimed is:

1. A communication device of handling data transmission, comprising:
    a storage device, for storing instructions of:
        configuring a first bearer and a second bearer according to at least one bearer configuration received from a network;
        encrypting a first packet of a first flow into a first encrypted packet according to an encryption key and a first bearer identity of the first bearer;
        receiving a first radio resource control (RRC) message from the network before transmitting the first encrypted packet to the network successfully, wherein the first RRC message configures the communication device to transmit at least one packet of the first flow via the second bearer to the network;
        transmitting the first encrypted packet to the network via the first bearer, after receiving the first RRC message;
        encrypting a second packet of the first flow into a second encrypted packet according to the encryption key and a second bearer identity of the second bearer in response to the first RRC message; and
        transmitting the second encrypted packet to the network via the second bearer; and
    a processing circuit, coupled to the storage device, configured to execute the instructions stored in the storage device.

2. The communication device of claim 1, wherein the instruction of receiving the first RRC message from the network before transmitting the first encrypted packet to the network successfully comprises:
    receiving the first RRC message from the network, before transmitting the first encrypted packet to the network; or
    receiving the first RRC message from the network, after transmitting the first encrypted packet to the network but not receiving an acknowledgment of the first encrypted packet from the network.

3. The communication device of claim 1, wherein the storage device further stores an instruction of:
    receiving at least one second RRC message from the network, wherein the at least one second RRC message comprises the at least one bearer configuration, wherein one of the at least one second RRC message indicates that the first flow is mapped to the first bearer.

4. The communication device of claim 1, wherein the storage device further stores an instruction of:
    encrypting a plurality of packets of the first flow into a plurality of encrypted packets and transmitting the plurality of encrypted packets to the network via the first bearer, when the communication device configures the first bearer according to one of the at least one bearer configuration.

5. The communication device of claim 1, wherein the storage device further stores an instruction of:
    receiving a plurality of encrypted packets of the first flow from the network via the first bearer and decrypting the plurality of encrypted packets of the first flow to a plurality of packets, when the communication device configures the first bearer according to one of the at least one bearer configuration.

6. The communication device of claim 3, wherein one of the at least one second RRC message or the first RRC message indicates that a second flow is mapped to the first bearer or the second bearer.

7. The communication device of claim 1, wherein the first bearer is a default data radio bearer (DRB) with a first quality of service (QoS) configuration, and the second bearer is a dedicated DRB with a second QoS configuration different from the first QoS configuration.

8. A network of handling data transmission, comprising:
    a storage device, for storing instructions of:
        transmitting at least one bearer configuration configuring a first bearer and a second bearer to a communication device;
        encrypting a first packet of a first flow into a first encrypted packet according to an encryption key and a first bearer identity of the first bearer;
        transmitting a first radio resource control (RRC) message to the communication device before transmitting the first encrypted packet to the communication device successfully, wherein the first RRC message configures the communication device to transmit at least one packet of the first flow to the network via the second bearer;
        transmitting the first encrypted packet to the communication device via the first bearer, after transmitting the first RRC message;
        encrypting a second packet of the first flow into a second encrypted packet according to the encrypted key and a second bearer identity of the second bearer in response to the first RRC message; and
        transmitting the second encrypted packet to the communication device via the second bearer; and
    a processing circuit, coupled to the storage device, configured to execute the instructions stored in the storage device.

9. The network of claim 8, wherein the instruction of transmitting the first RRC message to the communication device before transmitting the first encrypted packet to the communication device successfully comprises:
    transmitting the first RRC message to the communication device, before transmitting the first encrypted packet to the network to the communication device.

10. The network of claim 8, wherein the instruction of transmitting the first RRC message to the communication device before transmitting the first encrypted packet to the communication device successfully comprises:
    transmitting the first RRC message to the communication device, after transmitting the first encrypted packet to the communication device but not receiving an acknowledgment of the first encrypted packet from the communication device.

11. The network of claim 8, wherein the storage device further stores an instruction of:

transmitting at least one second RRC message to the communication device, wherein the at least one second RRC message comprises the at least one bearer configuration, wherein one of the at least one second RRC message indicates that the first flow is mapped to the first bearer or the second bearer.

12. The network of claim 8, wherein the storage device further stores an instruction of:

encrypting a plurality of packets of the first flow into a plurality of encrypted packets and transmitting the plurality of encrypted packets to the communication device via the first bearer, when the network configures the first bearer to the communication device.

13. The network of claim 8, wherein the storage device further stores an instruction of:

receiving a plurality of encrypted packets of the first flow from the communication device via the first bearer and decrypting the plurality of encrypted packets of the first flow to a plurality of packets, when the network configures the first bearer to the communication device.

14. The network of claim 11, wherein one of the at least one second RRC message or the first RRC message indicates that a second flow is mapped to the first bearer or the second bearer.

15. The network of claim 8, wherein the first bearer is a default data radio bearer (DRB) with a first quality of service (QoS) configuration, and the second bearer is a dedicated DRB with a second QoS configuration different from the first QoS configuration.

\* \* \* \* \*